United States Patent
Corporon et al.

(10) Patent No.: US 9,188,293 B1
(45) Date of Patent: Nov. 17, 2015

(54) LIGHTING DEVICE EMBEDDED IN VEHICLE PANEL AND METHOD FOR MAKING THE SAME

(71) Applicant: Grote Industries, LLC, Madison, IN (US)

(72) Inventors: Jay Corporon, Charlestown, IN (US); Donald L. Gramlich, Jr., Deputy, IN (US); Gerald Nix, Nashville, IN (US); Larry Bennett, Shirley, IN (US)

(73) Assignee: Grote Industries, LLC, Madison, IN (US)

( * ) Notice: Subject to any disclaimer, the term of this patent is extended or adjusted under 35 U.S.C. 154(b) by 0 days.

(21) Appl. No.: 14/291,343

(22) Filed: May 30, 2014

(51) Int. Cl.
*F21S 4/00* (2006.01)
*F21S 8/02* (2006.01)
*F21S 8/10* (2006.01)

(52) U.S. Cl.
CPC ............... *F21S 8/024* (2013.01); *F21S 4/008* (2013.01); *F21S 48/00* (2013.01); *F21S 48/31* (2013.01)

(58) Field of Classification Search
CPC ...... B60Q 1/26; B60Q 1/2611; B60Q 1/2696; B60Q 3/025; B60Q 1/32; F21S 4/00; F21S 4/003; F21S 48/215; F21S 48/218; F21S 8/00; F21W 2101/02; F21Y 2101/02; F21Y 2103/003; F21Y 2113/007; F21Y 2113/005; F21V 13/04; G08B 13/1961
USPC ............... 362/249.01, 249.02, 364, 485, 487, 362/495–498, 505, 506, 540–545, 549; 340/463, 468, 472, 478
See application file for complete search history.

(56) References Cited

U.S. PATENT DOCUMENTS

| | | | | |
|---|---|---|---|---|
| 6,149,288 A * | 11/2000 | Huang | | 362/545 |
| 6,257,746 B1 | 7/2001 | Todd et al. | | |
| 6,505,963 B1 * | 1/2003 | Chiang | | 362/545 |
| 6,619,824 B1 * | 9/2003 | Hou | | 362/501 |
| 6,641,294 B2 * | 11/2003 | Lefebvre | | 362/544 |
| 6,919,800 B2 * | 7/2005 | Wu | | 340/463 |
| 7,374,322 B2 * | 5/2008 | Steen et al. | | 362/487 |
| 7,484,870 B2 * | 2/2009 | Pederson | | 362/540 |
| 7,621,662 B1 * | 11/2009 | Colbert | | 362/493 |
| 8,007,155 B2 | 8/2011 | Bolander, Jr. et al. | | |
| 9,006,756 B2 * | 4/2015 | Lin et al. | | 257/88 |
| 2002/0041110 A1 | 4/2002 | Odashima et al. | | |
| 2005/0157500 A1 * | 7/2005 | Chen et al. | | 362/294 |

(Continued)

OTHER PUBLICATIONS

International Search Report and Written Opinion of the International Searching Authority mailed Jul. 6, 2015 in the corresponding PCT international patent application No. PCT/US2015/022645.

*Primary Examiner* — Hargobind S Sawhney
(74) *Attorney, Agent, or Firm* — Posz Law Group, PLC

(57) ABSTRACT

A body panel is provided for use in the body of a vehicle, comprising: a main panel having a first side and a second side, the main panel including a recess in the first side, the recess having a set shape and a depth less than a thickness of the main panel, and a hole from a bottom of the recess to the second side; a flexible lighting strip formed in the recess, the flexible lighting strip having the set shape and a thickness within ±10% of the depth of the recess, the flexile lighting device being secured in the recess; a power connector connected to the flexible lighting strip; a control connector connected to a device controller; and a clear coating formed on the first side of the main panel over the main panel and the flexible lighting strip, the clear coating having a smooth top surface.

18 Claims, 6 Drawing Sheets

(56) References Cited

U.S. PATENT DOCUMENTS

| | | |
|---|---|---|
| 2005/0213342 A1 | 9/2005 | Tufte |
| 2006/0146531 A1* | 7/2006 | Reo et al. .................. 362/244 |
| 2007/0091631 A1 | 4/2007 | Mathieu |
| 2010/0127851 A1 | 5/2010 | Olesen et al. |
| 2010/0212819 A1 | 8/2010 | Salter et al. |
| 2012/0097100 A1 | 4/2012 | Ryan |
| 2013/0134937 A1* | 5/2013 | Umeda et al. ................ 320/109 |
| 2014/0185293 A1* | 7/2014 | Ayotte et al. ............ 362/249.02 |

* cited by examiner

LIGHTING DEVICE EMBEDDED IN VEHICLE PANEL AND METHOD FOR MAKING THE SAME

FIELD OF THE INVENTION

The present invention relates generally to lighting devices used in vehicles, and more particularly to lighting devices that are formed in the body panels of vehicles.

BACKGROUND OF THE INVENTION

Most vehicles, especially motorized vehicles, such as motorcycles, automobiles, trucks, boats, airplanes, etc. employ lights for a variety of purposes. These lights can include headlights, brake lights, running lights, warning lights, identification lights, decorative lights, etc., and these lights can be located at any position on the vehicle, e.g., on the side, on the front, on the back, on the top, or on the bottom.

Conventionally, when a light is to be provided for a vehicle, a hole is formed in a body portion or a body panel for the vehicle that is the size of the light, or even a little larger. The light and the fixtures to support the light are then pushed through the hole and secured in place to provide the required illumination.

The lights currently used by vehicles tend to be incandescent lights or fluorescent lights, which take up a relatively large amount of space for the amount of light produced, and require bulky fixtures to hold them, and lenses to properly focus the light. As a result, lights on vehicles are currently very obvious and their presence can serve to disrupt the design of the vehicle. In particular, even when a light is off (e.g., in the daytime), the light is still quite obvious to anyone looking at the vehicle.

It would be desirable, therefore, to provide a vehicle light that was small and unobtrusive, and that would not be visible to nearby observers when not in use.

SUMMARY OF THE INVENTION

A body panel for use in the body of a vehicle is provided that includes a main panel having a first side and a second side, the main panel including a recess in the first side, the recess having a set shape and a depth less than a thickness of the main panel, and a hole from a bottom of the recess to the second side; a flexible lighting strip formed in the recess, the flexible lighting strip having the set shape and a thickness within ±10% of the depth of the recess, the flexile lighting device being secured in the recess; a power connector connected to the flexible lighting strip; a control connector connected to a device controller; and a clear coating formed on the first side of the main panel over the main panel and the flexible lighting strip, the clear coating having a smooth top surface.

The power connector may be connected to a power source; and the control connector may be connected to a device controller configured to control operation of the flexible light strip.

The flexible lighting strip may be secured in the recess by an adhesive substance. The adhesive substance may be one of a liquid adhesive or double-sided tape.

The main panel and the flexible lighting strip may both be the same color.

The clear coating may be made of a urethane material.

The main body of the flexible lighting element may be made of one of plastic, fiberglass, or metal.

The flexible lighting strip may include a first surface and a second surface opposite the first surface, the flexible lighting strip may include a plurality of light-emitting elements configured to emit light from the first surface, and the flexible lighting strip may be formed in the recess such that the second surface is facing a bottom inside surface of the recess.

The light-emitting elements may be light-emitting diodes.

A method of manufacturing a body panel for use in the body of a vehicle is provided, including: molding a main panel having a first side and a second side, the main panel including a recess in the first side, the recess having a set shape and a depth less than a thickness of the main panel, and a hole from a bottom of the recess to the second side; applying a securing mechanism to a bottom inside surface of the recess; passing a first end of a power connector through the hole from the first side to the second side, a second end of the power connector being connected to a flexible lighting strip; passing a first end of a control connector through the hole from the first side to the second side, a second end of the control connector being connected to the flexible lighting strip; inserting the flexible lighting strip in the recess such that the flexible lighting strip is secured in the recess by the securing mechanism; forming a clear coating on the first side of the main panel over the main panel and the flexible lighting strip, such that the clear coating has a smooth top surface, wherein the flexible lighting strip has the set shape, and the flexible lighting strip has a thickness within ±10% of the depth of the recess.

The method may further include: connecting the first end of the power connector to a power source; and connecting the first end of the control connector to a device controller configured to control operation of the flexible light strip.

The affixing mechanism may be a liquid adhesive.

The main panel and the flexible lighting strip may both be the same color.

The flexible lighting strip may include a first surface and a second surface opposite the first surface, the flexible lighting strip may include a plurality of light-emitting elements configured to emit light from the first surface, and the flexible lighting strip may be inserted into the recess such that the second surface is facing the bottom inside surface of the recess.

The light-emitting elements may be light-emitting diodes.

The clear coating may be made of a urethane material. The deposition of the clear coating may be performed by spray painting.

The main body of the flexible lighting element may be made of one of plastic, fiberglass, or metal.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Furthermore, elements having the same number represent the same element across the various figures, and throughout the disclosure. Their description is not always repeated for each embodiment, but may be inferred from previous descriptions. Elements that have the same number but have the addition of a letter designator indicate distinct embodiments of a more generic element.

Lighting Device System

Figure 1:
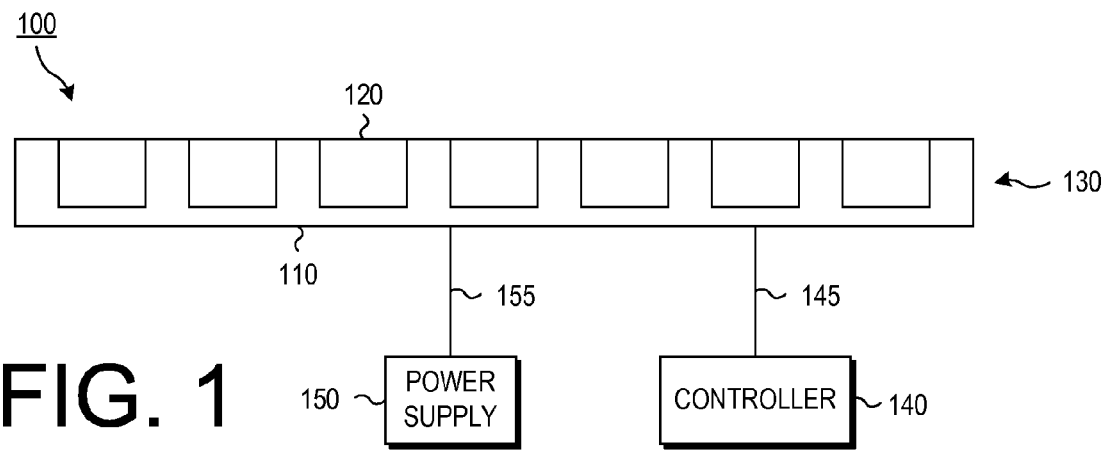
FIG. 1 is side cross-sectional view of a lighting device system according to disclosed embodiments.

FIG. 1 is side cross-sectional view of a lighting device system 100 according to disclosed embodiments. As show in FIG. 1, the lighting device system 100 includes a base 110 that has a plurality of light-emitting elements 120 embedded in it. Together, the base 110 and the plurality of light-emitting elements 120 can be considered to be a lighting device 130. The base 110 and the light-emitting elements are connected to a controller 140 via a control line 145, and are connected to a power supply 150 via a power line 155.

The base 110 can include an opaque substrate in a bottom portion that is made, at least in part, of polyethylene terephthalate (PET), polyethylene napthalate (PEN), polyester, a polymer, an oxide-coated polymer, a flexible plastic, a metal-coated flexible plastic, or any suitable flexible material. If the entire flexible lighting device needs to be flexible, then the base 110 should be flexible. Because light does not shine out of the bottom of the base 110, it is not necessary for the opaque substrate in the base 110 to be transparent to light.

The opaque substrate in the base 110 may be covered by a transparent affixing layer or a transparent protection layer formed to protect the light-emitting elements 120.

In the disclosed embodiments, the visible portion of the base 110 is formed of a material that can easily be colored a large variety of colors, e.g., by dying. In one embodiment, the base 110 will include a clear top substrate connected to an opaque bottom substrate by a hot-melt adhesive (with the light-emitting elements being sandwiched between the upper and lower substrates). In such an embodiment, the color of the hot-melt adhesive can be matched to a body panel to which it will be attached. In another similar embodiment, a clear adhesive could be used and the lower substrate could be dyed.

Regardless of how it is achieved, the color of the base 110 will be made to match that of a body panel to which it is to be attached. This allows the base 110 to blend in with the body panel when it is observed.

The light-emitting elements 120 are devices configured to emit light, such as light of a specific small distribution of wavelengths (e.g., ultraviolet light, blue light, green light, infrared light, or any light with a wavelength between 10 nm and 100,000 nm) or light in a wide range of wavelengths (e.g., white light). By way of example, light of a specific small distribution of wavelengths can be defined by a center wavelength ±15 nm, and light in a wide range of wavelengths can be defined by a center wavelength ±200-250 nm.

In some embodiments the light-emitting elements 120 are light-emitting diodes (LEDs) that emit light of a particular wavelength; in other embodiments the light-emitting elements 120 are LEDs that emit light in a particular range of wavelengths; and in still other embodiments the light-emitting elements 120 are LEDs that include lenses to focus, diffuse, or color the light.

In still other embodiments, the light-emitting elements 120 are a group of LEDs that are controlled either together or separately. For example, a single light-emitting element 120 could include a red LED, a green LED, and a blue LED. In some embodiments these LEDs could have their anodes and cathodes tied together; in others, they could be separately connected to different positive and negative conductive elements, or even connected to different positive conductive elements but the same negative conductive element, or connected to different negative conductive elements but the same positive conductive element.

The controller 140 can be any sort of device, such as a microcomputer, that can provide control signals to control the operation of the light-emitting elements 120. In some embodiments, this can be a vehicle controller that controls various aspects of the vehicle's operation.

The control line 145 can be any sort of signal line capable of conveying control signals from the controller 140 to the base 110 and then to the light-emitting elements 120.

The power supply 150 can be any sort of vehicular power supply, such as, a main vehicle battery, an auxiliary vehicle battery, or an alternator.

The power line 155 can be any sort of line capable of conveying power from the power supply 150 to the base 110 and then to the light-emitting elements 120. In one disclosed embodiment, the power line 155 is a two-conductor cable.

Figure 2:
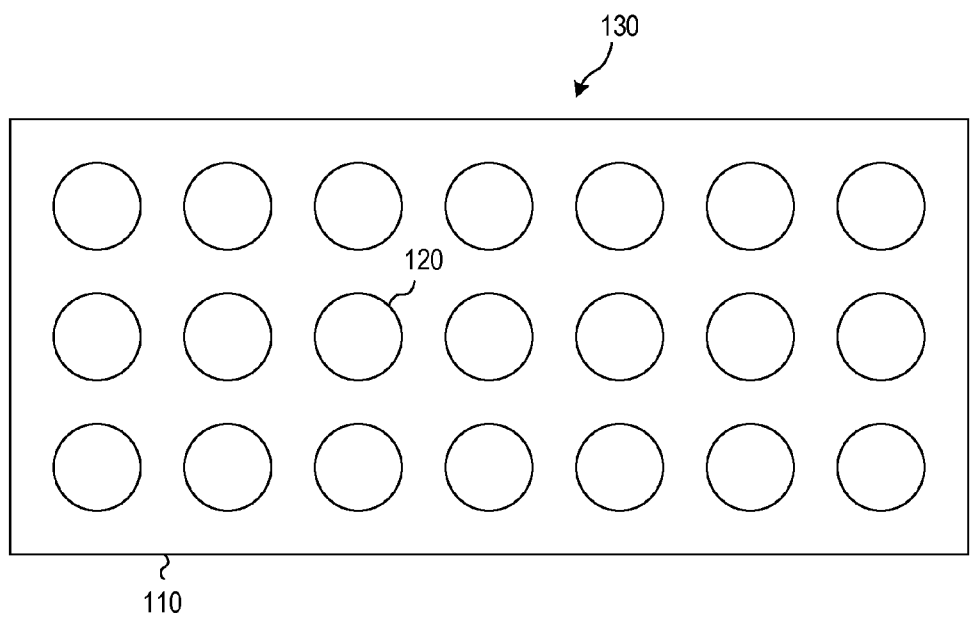
FIG. 2 is an overhead view of the lighting device system of FIG. 1.

FIG. 2 is an overhead view of the lighting device 130 of FIG. 1. As shown in FIG. 2, the lighting device 130 includes light-emitting elements 120 that are arranged in an array at the surface of the base 110. In a particular embodiment disclosed in FIG. 2, the light-emitting elements 120 are arranged in a rectangular array. However, this is by way of example only. In other embodiments, the light-emitting elements 120 can be formed into whatever patterns are desirable.

In addition, while the light-emitting elements 120 are shown as being large relative to the base 110, in practice they may be much smaller than illustrated. For example, in embodiments employing LEDs as the light-emitting elements 120, the LEDs may be small enough that they are not visible to the naked eye from a distance of several feet.

Lighting Device System Embedded in a Body Panel

Figure 3:
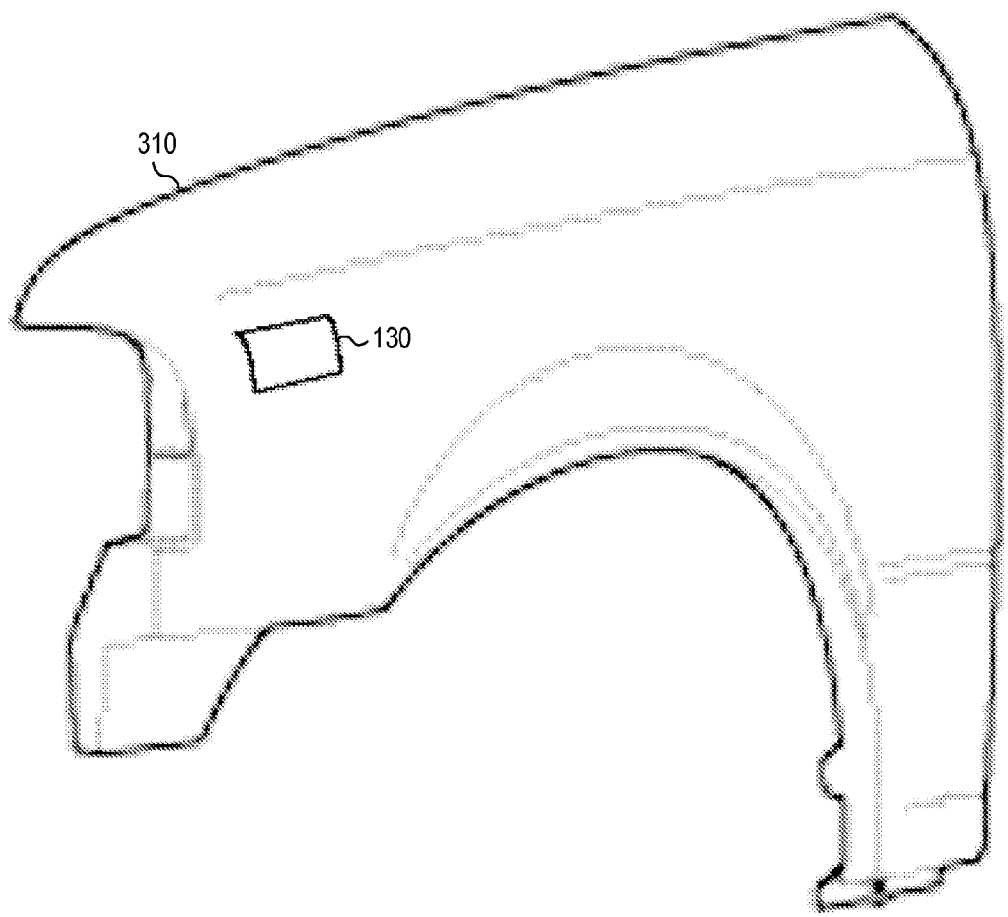
FIG. 3 is a perspective view of a body panel that includes an embedded lighting device according to disclosed embodiments.

FIG. 3 is a perspective view of a body panel 310 that includes an embedded lighting device 130 according to disclosed embodiments. In this particular embodiment, the body panel 310 is that of an automobile or truck. However, this is by way of example only. Alternate embodiments could apply to body panels of any sort of vehicle, e.g., a boat, a plane, a train, etc.

In the particular embodiment disclosed in FIG. 3, the body panel 310 is made of a material, such as plastic, which can be molded into its shape. However, this is by way of example only. Alternate embodiments could employ other materials, such as metal, which can be pressed into its shape.

As shown in FIG. 3, the embedded lighting device 130 is formed on an outward-facing side of the body panel 310. The positioning of the embedded lighting device 130 can vary as needed, and in some embodiments a single body panel could potentially have multiple embedded lighting devices 130. The shape and design of the embedded lighting device(s) 130 can vary depending upon the type and shape of light desired. Essentially, an embedded lighting device 130 can be placed wherever it is desirable to have a light in the body panel 310, and in whatever size or shape is needed for the light.

Figure 4:
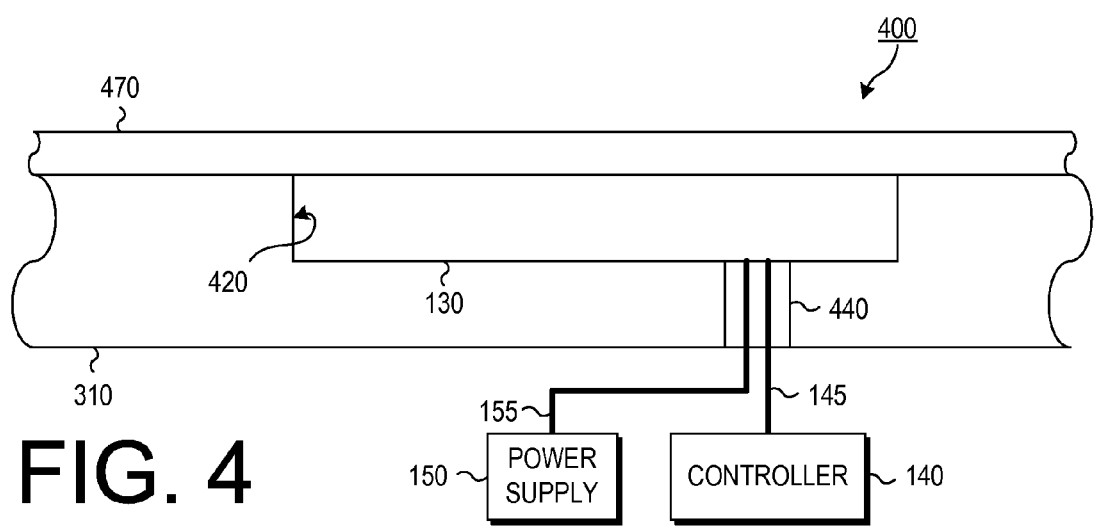
FIG. 4 is side cross-sectional view of a body panel with embedded lighting device according to disclosed embodiments.

FIG. 4 is side cross-sectional view of a body panel 310 with embedded lighting device 130 according to disclosed embodiments. As shown in FIG. 4, the body panel 310 includes a recess 420 and a hole 440. The embedded lighting device 130 is placed inside the recess 420. A control line 145 is connected to the back of the embedded lighting device 130 and extends through the hole 440 to a controller 140 on the opposite side of the body panel 310 from the recess 420. A power line 155 is connected to the back of the embedded lighting device 130 and extends through the hole 440 to a power supply 150 on the opposite side of the body panel 310 from the recess 420. Finally, a clear coating 470 is applied over the body panel 310 and the embedded lighting device 130.

The body panel 310, the embedded lighting device 130, the controller 140, the control line 145, the power supply 150, and the power line 155 operate as disclosed above with respect to FIGS. 1 and 2. Their description will not be repeated here.

The recess 420 is formed in the body panel 310 to a depth equal to the thickness of the lighting device 130 to be embedded in it. In various embodiments, the recess can be a depression whose depth is not greater than a thickness of the body panel, or a depression whose depth is greater than the thickness of the body panel 310, and which protrudes out from an opposite side of the body panel 310.

The hole 440 is formed in the recess 420, between a bottom surface of the recess and a side of the body panel 310 opposite to the side in which the recess 420 is formed. It should be large enough to accommodate both the control line 145 and the power line 155. It should also be located in such a place that it matches a spot on the lighting device 130 where the control line 145 and the power line 155 protrude. In this way, the control line 145 and the power line 155 can be easily placed into the hole without having to run along any portion of the bottom of the recess 420. This will allow the lighting device 130 to fit more snugly into the recess 420.

In alternate embodiments, the hole 440 could be located on the side of the recess 420. In such embodiments, it should nevertheless passed through to the opposite side of the body panel 310, and be large enough to accommodate the control line 145 and the power line 155.

The clear coating 470 is deposited over both the body panel 310 and the embedded lighting device 130. In some embodiments the clear coating 470 comprises a kind of urethane. However, this is by way of example only. Any clear substance that can sufficiently protect the base 110, the light-emitting elements 120, and the body panel 310 can be used as the clear coating 470.

Because the clear coating is deposited over the lighting device 130 and the body panel 130, it gives the resulting structure a smooth surface, and prevents the detection of a seam where the embedded lighting device 130 fits into the recess 420. A person running their hand over the resulting coated body panel would feel only a smooth surface without any evidence at all that there is a lighting device 130 embedded in the coated body panel.

Figure 5:
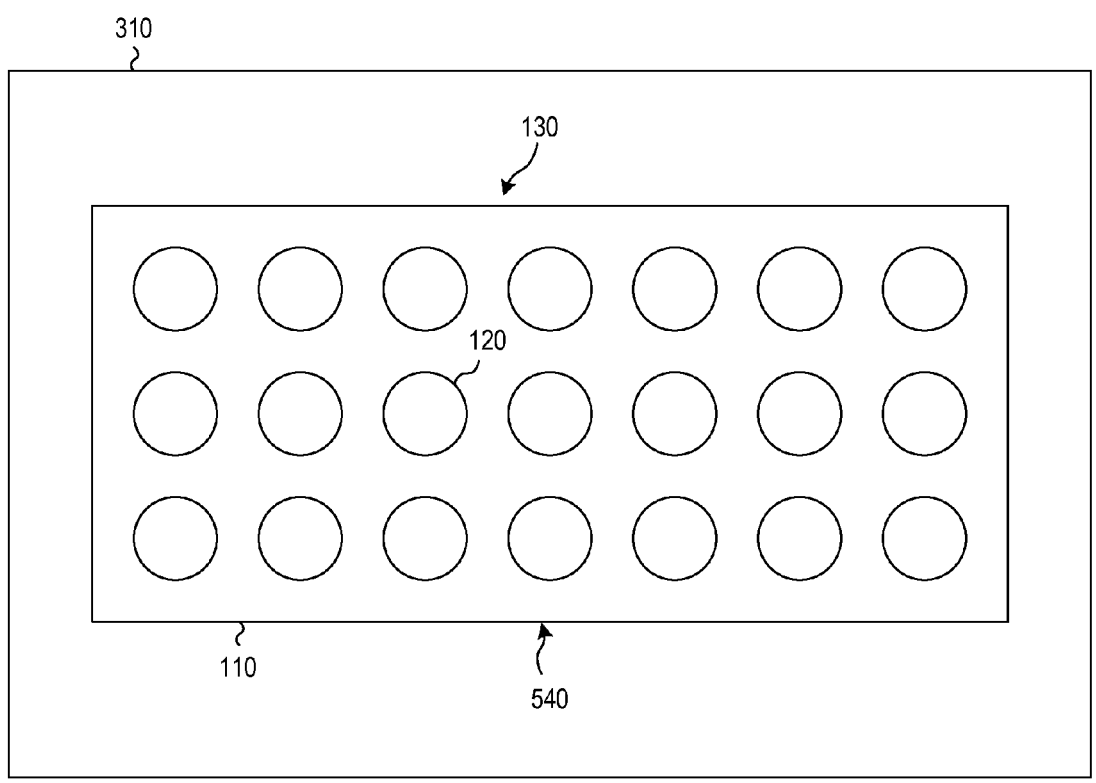
FIG. 5 is an overhead view of the body panel with embedded lighting device of FIG. 4 according to disclosed embodiments.

FIG. 5 is an overhead view of the body panel 310 with embedded lighting device 130 of FIG. 4 according to disclosed embodiments. As shown in FIG. 5, the recess 420 is the same size and shape as the embedded lighting device 130. As a result, the embedded lighting device 130 fills the recess 420 without any gap between a side of the embedded lighting device 130 and a side of the recess 420.

Furthermore, if the base 110 of the embedded lighting device 130 is formed to be of the same color as the body panel 310, the embedded lighting device 130 will appear as if it were part of the body panel 310. Because it fits tightly into the recess 420, it will be difficult to tell from any significant distance where the body panel 310 stops and the embedded lighting device 130 begins. In other words, a person examining the body panel 310 would have difficulty seeing the perimeter line 540 of the recess 420 and the embedded lighting device.

In addition, if the light-emitting elements 120 in the embedded lighting device 130 are selected to be relatively small (e.g., LEDs), then when the light-emitting elements 120 are turned off, it will be difficult to detect them as well. This can give the appearance of a smooth, uninterrupted body panel 310 when the light-emitting elements 120 are off, despite the fact that the embedded lighting device 130 is present.

Thus, with the clear coating 470 making it difficult to detect the presence of the embedded lighting device 130 by touch, and the coloring of the base 110 of the light-emitting device 130 making it difficult to detect the presence of the embedded lighting device 130 by sight, it becomes extremely difficult for anyone to notice the presence of the embedded lighting device 130, except by close examination. As a result, when the light-emitting elements 120 are off, the vehicle will look as if it had no lighting elements from a distance, thus enhancing the appearance of the vehicle.

Manufacturing Process

Figure 6A:
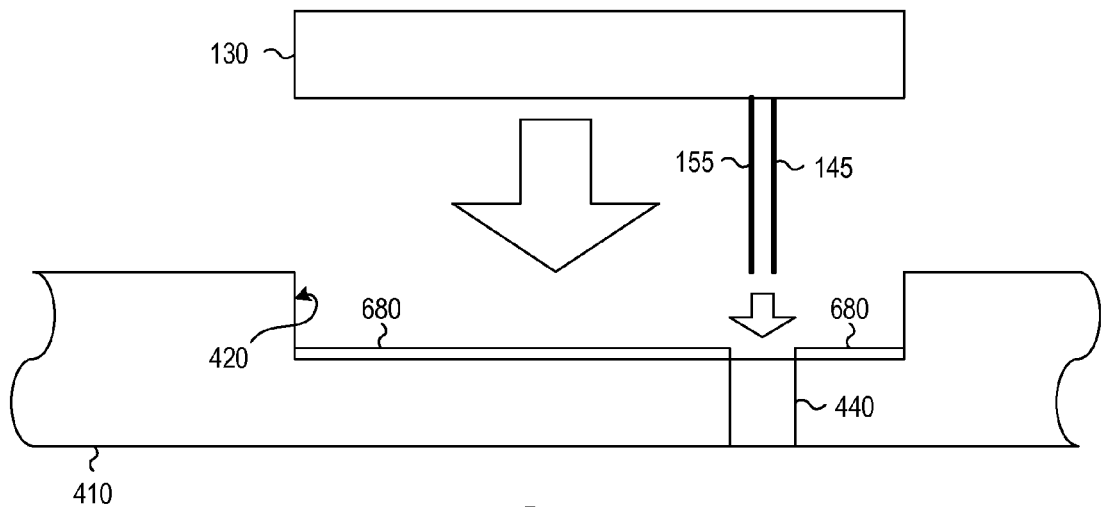
FIGS. 6A and 6B are side cross-sectional views showing a manufacturing process of the body panel with embedded lighting device of FIG. 4 according to first disclosed embodiments.
Figure 6B:
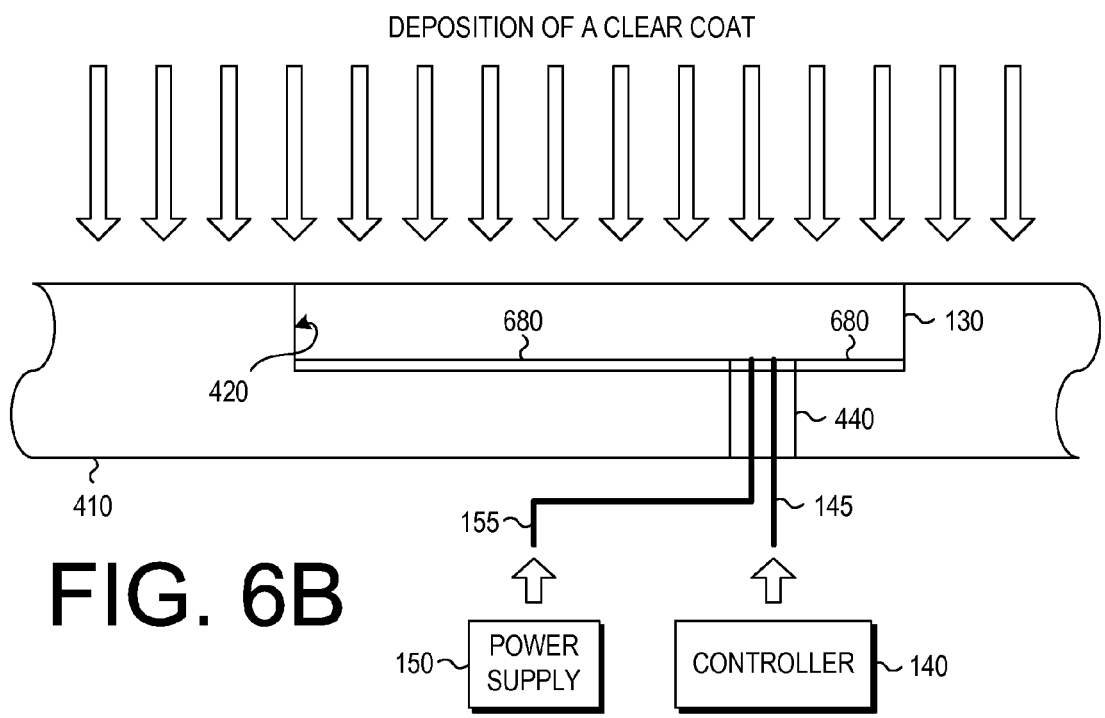

FIGS. 6A and 6B are side cross-sectional views showing a manufacturing process of the body panel with embedded lighting device of FIG. 4 according to first disclosed embodiments.

As shown in FIG. 6A, the body panel 310 is initially formed to include the recess 420 and the hole 440. In some embodiments, the body panel 310 can be made of molded plastic, fiberglass, or the like. In this case the mold is created such that the resulting molded body panel includes the recess 420 and the hole 440. In other embodiments the body panel 310 could be made of metal. In this case, the metal body panel is formed (e.g. pressed) to include the recess 420 and the hole 440.

Typically the body panel 310 will be painted prior to having the lighting device 130 attached to it. In this case, it is the color that the body panel 310 is painted that the color of the lighting device 130 is set to match.

An affixing material 680 is then deposited on the bottom of the recess 420. This affixing material 680 can be glue, double-sided tape, or any material that could affix the lighting device 130 into the recess 420.

The lighting device 130 is then placed in the recess 420 in such a manner that the control line 145 and the power line 155 pass through the hole 440. In this way, the control line 145 and the power line 155 will not interfere with the lighting device 130 being affixed into the recess 420 by the affixing material 680.

As shown in FIG. 6B, once the lighting device 130 is a fixed into the recess 420, a clear material (e.g., a urethane) is deposited over the lighting device 130 and the side of the body panel 310 in which the recess 420 is formed. In this way, the clear coating 470 is formed to make a smooth surface on one side of the body panel 310, as shown in FIG. 4.

In addition, the control wire 145 is attached to the controller 140, and the power line 155 is connected to the power supply 150. In this way, the lighting device 130 can receive both power to turn on its light-emitting elements 120, and the control signals to know when to turn them on and off Although the adhesive material 680 is shown in both FIGS. 6A and 6B, and not in FIG. 4, the adhesive material is also contained in the embodiment of FIG. 4. It is simply omitted from the drawing for the purposes of simplicity.

Variable Thickness of Lighting Device System

Figure 7:
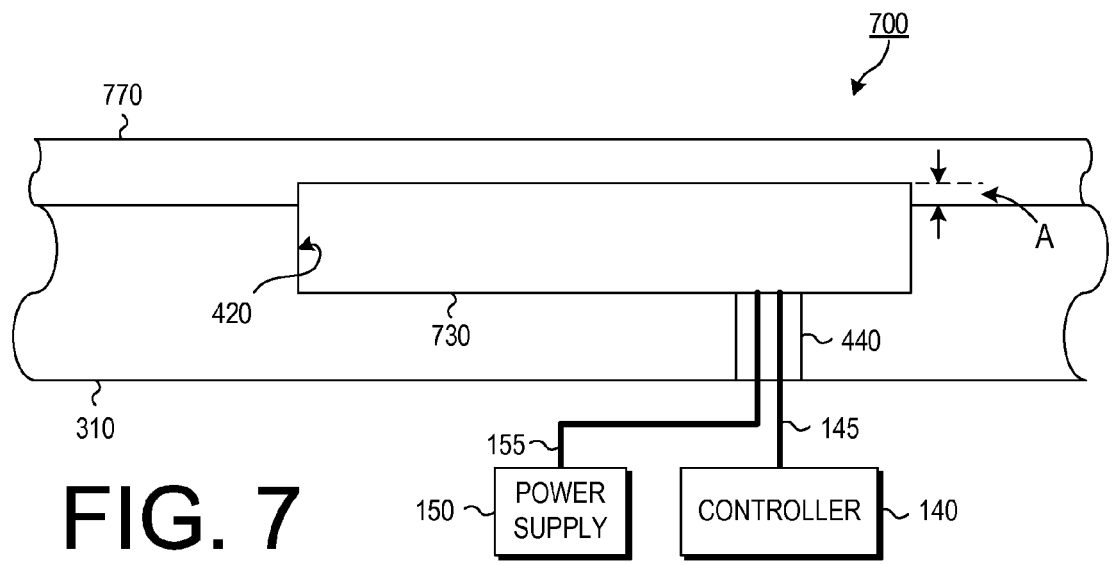
FIG. 7 is side cross-sectional view of a body panel with embedded lighting device in which the lighting device is thicker than a recess provided for it according to disclosed embodiments.
Figure 8:
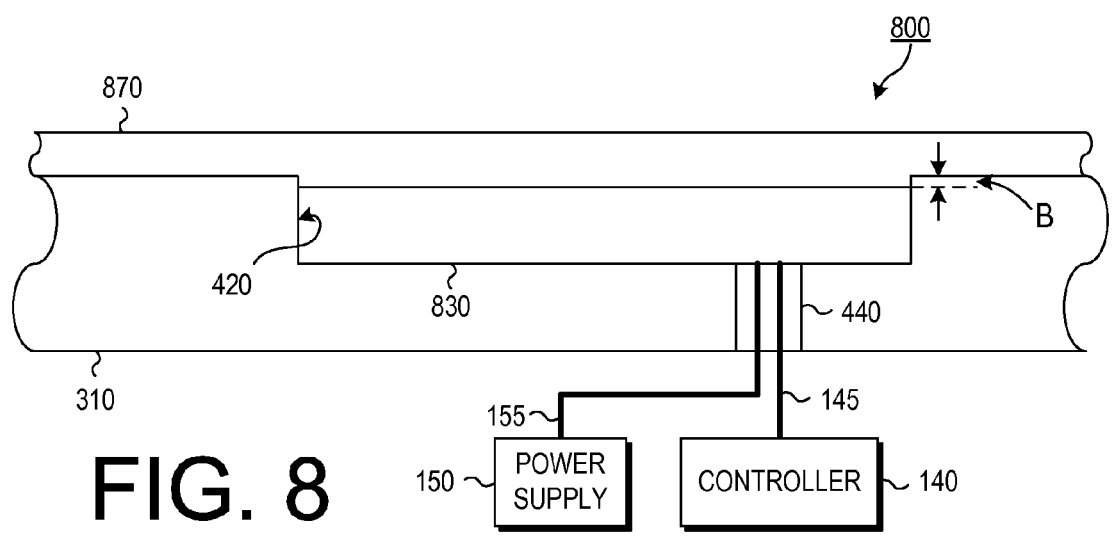
FIG. 8 is side cross-sectional view of a body panel with embedded lighting device in which the lighting device is thinner than a recess provided for it according to disclosed embodiments.

In the embodiment shown in FIGS. 4 to 6B, the lighting device 130 is shown as being flush with the surface of the body panel 310 when it is embedded in the recess 420. However, it is possible for a variety of reasons for the top surface of the lighting device 130 and the surface of the body panel 310 to be out of alignment with each other. FIGS. 7 and 8 show embodiments in which the top surface of the lighting device 130 is higher than the surface of the body panel 310, and in which the top surface of the lighting device 130 is lower than the surface of the body panel 310.

FIG. 7 is side cross-sectional view of a body panel 310 with embedded lighting device 130 in which the lighting device 130 is thicker than a recess 420 provided for it according to disclosed embodiments. As shown in FIG. 7, the disclosed lighting system 700 includes a body panel 310 that includes a recess 420 and a hole 440, a lighting device 730, a controller 140, a control line 145, a power supply 150, a power line 155, and a clear coating 770.

Elements with the same in numbers as previous drawings operate as described above. Their description will not be repeated here.

As can be seen in FIG. 7, the lighting device 730 is thicker in this embodiment then the depth of the recess 420 in the body panel 310. As a result, the lighting device 730 protrudes from the recess 420 by a distance A. This means that the top surface of the lighting device 730 is not in alignment with the surface of the body panel 310 containing the recess 420.

However, when the clear coating 770 is applied to the surface of the body panel 310 containing the recess 420, it will cover both the body panel 310 and the lighting device 730. Furthermore, if the thickness of the clear coating 770 is greater than the distance A, the irregularity between the surface of the lighting device 730 and the surface of the body panel 310 should be virtually undetectable by touch. A person running their hand along the portion of the body panel 310 containing the embedded lighting device 730 would feel only the smooth clear coating 770 and not the irregularity in height between the embedded lighting device 730 and the body panel 310. In this way, the presence of the embedded lighting device 730 can be hidden from detection by touch, even in situations in which the lighting element 730 is slightly thicker than the depth of the recess 420.

FIG. 8 is side cross-sectional view of a body panel 310 with embedded lighting device 830 in which the lighting device 830 is thinner than a recess 420 provided for it according to disclosed embodiments. As shown in FIG. 8, the disclosed lighting system 800 includes a body panel 310 that includes a recess 420 and a hole 440, a lighting device 830, a controller 140, a control line 145, a power supply 150, a power line 155, and a clear coating 870.

Elements with the same in numbers as previous drawings operate as described above. Their description will not be repeated here.

As can be seen in FIG. 8, the lighting device 830 is thinner in this embodiment then the depth of the recess 420 in the body panel 310. As a result, the top surface of the lighting device 830 extends down into the recess 420 by a distance B. this means that the top surface of the lighting device 830 is not in alignment with the surface of the body panel 310 containing the recess 420.

However, when the clear coating 870 is applied to the surface of the body panel 310 containing the recess 420, it will cover both the body panel 310 and the lighting device 830. As a result, the irregularity between the surface of the lighting device 830 and the surface of the body panel 310 should be virtually undetectable by touch. A person running their hand along the portion of the body panel 310 containing the embedded lighting device 830 would feel only the smooth clear coating 870 and not the irregularity in height between the embedded lighting device 830 and the body panel 310. In this way, the presence of the embedded lighting device 830 can be hidden from detection by touch, even in situations in which the lighting element 830 is slightly thinner than the depth of the recess 420.

Thus, as shown in FIGS. 4, 7, and 8 the use of the clear coating 470, 770, 870 means that the presence of the embedded lighting device 130, 730, 830 will be virtually undetectable by touch whether the embedded lighting device 130 is the same thickness as the depth of the recess 420, whether the embedded lighting device 730 is thicker than the depth of the recess 420, or whether the embedded lighting device 830 is thinner than the depth of the recess 420.

Method of Manufacture

Figure 9:
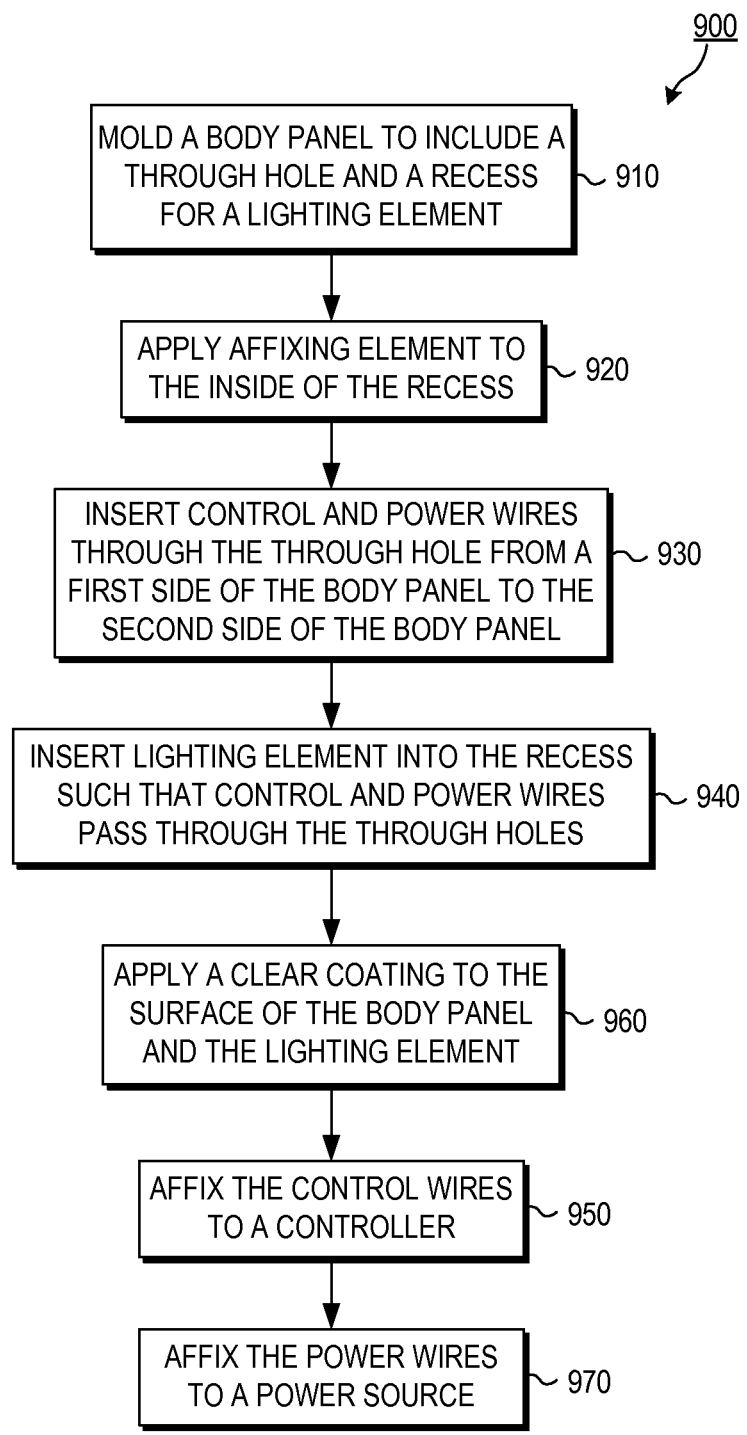
FIG. 9 is a flow chart describing the operation of manufacturing a body panel with embedded lighting device according to disclosed embodiments.

FIG. 9 is a flow chart describing the operation of manufacturing a body panel with embedded lighting device according to disclosed embodiments.

As shown in FIG. 9, the process begins when a body panel is molded to include a recess on a first side of the body panel, and a through hole in the recess (910). As noted above, the recess should be the same size and shape as the lighting element (e.g., a flexible lighting strip) that will be placed inside the recess. The hole should be located where control and power wires from the lighting element can easily pass through it. In some embodiments, the body panel may be painted to have a particular color.

An affixing element is then applied to the inside of the recess (920). Typically, this will involve applying the affixing element to a bottom surface of the recess. In various embodiments, the affixing element can be glue, double-sided tape, or any material that can serve to a fix the lighting element into the recess.

Control and power wires connected to a lighting device are then inserted through the through hole from a first side of the body panel (930).

The lighting element is then inserted into the recess such that the control and power wires pass through the through hole (940). The lighting element is pressed into the recess such that it contacts the affixing element and is affixed into the recess.

The lighting element is manufactured to have the same color as the body panel to make it blend in with the body panel. If the body panel is unpainted, then the lighting element matches the natural color of the body panel. If the body panel is painted, then the lighting element matches the painted color of the body panel.

Once the lighting element has been affixed into the recess, a clear coating is applied to the first side of the body panel and to the exposed surface of the lighting element (950). This clear coating provides a smooth surface over the entirety of the first side of the body panel and the exposed surface of the lighting element, making it hard to detect by touch where the body panel and the lighting element meet.

Finally the control wires are fixed to a controller (960) and the power wires are fixed to a power source (970). In this way, the lighting element can be provided with both control signals to determine when its lights should turn on and off, and the power for the lights to operate.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A body panel for use in the body of a vehicle, comprising:
    a main panel having a first side and a second side, the main panel including
        a recess in the first side, the recess having a set shape and a depth less than a thickness of the main panel, and
        a hole from a bottom of the recess to the second side;
    a flexible lighting strip formed in the recess, the flexible lighting strip having the set shape and a thickness within ±10% of the depth of the recess, the flexile lighting device being secured in the recess;
    a power connector connected to the flexible lighting strip;
    a control connector connected to a device controller; and
    a clear coating formed on the first side of the main panel over the main panel and the flexible lighting strip, the clear coating having a smooth top surface.

2. The body panel recited in claim 1, wherein
    the power connector is connected to a power source; and
    the control connector is connected to a device controller configured to control operation of the flexible light strip.

3. The body panel recited in claim 1, wherein
    the flexible lighting strip is secured in the recess by an adhesive substance.

4. The body panel recited in claim 3, wherein
    the adhesive substance is one of a liquid adhesive or double-sided tape.

5. The body panel recited in claim 1, wherein
    the main panel and the flexible lighting strip are both the same color.

6. The body panel recited in claim 1, wherein
    the clear coating comprises a urethane material.

7. The body panel recited in claim 1, wherein
    a main body of the flexible lighting element is made of one of plastic, fiberglass, or metal.

8. The body panel recited in claim 1, wherein
    the flexible lighting strip includes a first surface and a second surface opposite the first surface,
    the flexible lighting strip includes a plurality of light-emitting elements configured to emit light from the first surface, and
    the flexible lighting strip is formed in the recess such that the second surface is facing a bottom inside surface of the recess.

9. The body panel recited in claim 8, wherein
    the light-emitting elements are light-emitting diodes.

10. A method of manufacturing a body panel for use in the body of a vehicle, comprising:
    molding a main panel having a first side and a second side, the main panel including
        a recess in the first side, the recess having a set shape and a depth less than a thickness of the main panel, and
        a hole from a bottom of the recess to the second side;
    applying an affixing mechanism to a bottom inside surface of the recess;
    passing a first end of a power connector through the hole from the first side to the second side, a second end of the power connector being connected to a flexible lighting strip;
    passing a first end of a control connector through the hole from the first side to the second side, a second end of the control connector being connected to the flexible lighting strip;
    inserting the flexible lighting strip in the recess such that the flexible lighting strip is secured in the recess by the affixing mechanism;
    forming a clear coating on the first side of the main panel over the main panel and the flexible lighting strip, such that the clear coating has a smooth top surface,
    wherein
    the flexible lighting strip has the set shape, and
    the flexible lighting strip has a thickness within ±10% of the depth of the recess.

11. The method of claim 10, further comprising:
    connecting the first end of the power connector to a power source; and
    connecting the first end of the control connector to a device controller configured to control operation of the flexible light strip.

12. The method of claim 10, wherein
    the affixing mechanism is one of a liquid adhesive or double-sided tape.

13. The method of claim 10, wherein
the main panel and the flexible lighting strip are both the same color.

14. The method of claim 10, wherein
the flexible lighting strip includes a first surface and a second surface opposite the first surface,
the flexible lighting strip includes a plurality of light-emitting elements configured to emit light from the first surface, and
the flexible lighting strip is inserted into the recess such that the second surface is facing the bottom inside surface of the recess.

15. The method of claim 14, wherein
the light-emitting elements are light-emitting diodes.

16. The method of claim 10, wherein
the clear coating comprises a urethane material.

17. The method of claim 10, wherein
the deposition of the clear coating is performed by spray painting.

18. The method of claim 10, wherein
a main body of the flexible lighting element is made of one of plastic, fiberglass, or metal.

\* \* \* \* \*